(12) United States Patent
Morishima

(10) Patent No.: US 10,767,604 B2
(45) Date of Patent: Sep. 8, 2020

(54) CONTROL DEVICE FOR INTERNAL COMBUSTION ENGINE

(71) Applicant: TOYOTA JIDOSHA KABUSHIKI KAISHA, Toyota-shi (JP)

(72) Inventor: Akinori Morishima, Naka-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 158 days.

(21) Appl. No.: 16/173,032

(22) Filed: Oct. 29, 2018

(65) Prior Publication Data

US 2019/0203671 A1   Jul. 4, 2019

(30) Foreign Application Priority Data

Dec. 29, 2017   (JP) .................. 2017-255153

(51) Int. Cl.
| | | |
|---|---|---|
| *F02M 26/25* | (2016.01) | |
| *F02M 26/05* | (2016.01) | |
| *F02M 26/28* | (2016.01) | |
| *F02M 26/33* | (2016.01) | |
| *F02D 41/00* | (2006.01) | |
| *F02M 26/06* | (2016.01) | |
| *F02M 26/47* | (2016.01) | |

(Continued)

(52) U.S. Cl.
CPC .......... *F02M 26/25* (2016.02); *F02D 41/005* (2013.01); *F02D 41/0072* (2013.01); *F02M 26/05* (2016.02); *F02M 26/06* (2016.02); *F02M 26/28* (2016.02); *F02M 26/33* (2016.02); *F02M 26/08* (2016.02); *F02M 26/35* (2016.02); *F02M 26/47* (2016.02)

(58) Field of Classification Search
CPC ........ F02M 26/25; F02M 26/05; F02M 26/28; F02M 26/33; F02M 26/06; F02M 26/47; F02M 26/08; F02M 26/35; F02D 41/0072; F02D 41/005; F02D 41/1445; F02D 41/1448; F02D 41/0007; F02D 41/0065
USPC ...................................... 123/568.12
See application file for complete search history.

(56) References Cited

U.S. PATENT DOCUMENTS

| | | | |
|---|---|---|---|
| 2014/0196704 A1* | 7/2014 | Shutty ............... | F02D 41/145 123/676 |
| 2015/0089942 A1* | 4/2015 | Kihara ............... | F02D 41/0072 60/605.2 |
| 2018/0149098 A1* | 5/2018 | Morishima ........... | F02M 26/26 |

FOREIGN PATENT DOCUMENTS

JP   2001-041110   2/2001

* cited by examiner

*Primary Examiner* — Joseph J Dallo
*Assistant Examiner* — Scott A Reinbold
(74) *Attorney, Agent, or Firm* — Oblon, McClelland, Maier & Neustadt, L.L.P.

(57) ABSTRACT

Provided is a control device for an internal combustion engine that includes an EGR device equipped with an EGR cooler bypass passage and a flow-rate-ratio control valve equipped with a valve disc and capable of controlling a flow rate ratio. The control device is configured, when an opening degree control execution condition is met, to execute a vibration reduction control for controlling the flow-rate-ratio control valve such that the opening degree of the valve disc becomes greater than or equal to a vibration reduction opening degree that is greater than a minimum opening degree within an opening degree control range of the valve disc. The opening degree control execution condition includes a requirement that a parameter (pulsation level (Continued)

value) that becomes greater when exhaust pulsation acting on the valve disc is greater is equal to or greater than a first threshold value.

6 Claims, 8 Drawing Sheets

(51) Int. Cl.
*F02M 26/08* (2016.01)
*F02M 26/35* (2016.01)

CONTROL DEVICE FOR INTERNAL COMBUSTION ENGINE

CROSS-REFERENCE TO RELATED APPLICATION

This application is based on and claims the benefit of Japanese Patent Application No. 2017-255153, filed on Dec. 29, 2017, which is incorporated by reference herein in its entirety.

BACKGROUND

Technical Field

The present disclosure relates to a control device for an internal combustion engine, and more particularly to a control device for controlling an internal combustion engine that includes a flow-rate-ratio control valve that controls, by adjustment of the opening degree of a valve disc, a flow rate ratio of the flow rate of EGR gas flowing through an EGR cooler and the flow rate of EGR gas bypassing the EGR cooler.

Background Art

For example, JP 2001-041110 A discloses a control device for an internal combustion engine that includes an EGR device.

The aforementioned EGR device is equipped with an EGR cooler arranged in an EGR passage and an EGR cooler bypass passage that bypasses the EGR cooler. Also, a flow-rate-ratio control valve is arranged in the EGR cooler bypass passage to adjust the flow rate ratio of the flow rate of EGR gas passing through the EGR cooler and the flow rate of EGR gas passing through the EGR cooler bypass passage.

SUMMARY

Since the flow-rate-ratio control valve disclosed in JP 2001-041110 A is arranged in a passage through which the EGR gas flows (in the example disclosed in JP 2001-041110 A, EGR cooler bypass passage), it is affected by exhaust pulsation (exhaust pressure pulsation). As a result, there is a concern that the flow-rate-ratio control valve vibrates due to the exhaust pulsation.

The present disclosure has been made to address the problem described above, and an object of the present disclosure is to provide a control device for an internal combustion engine that can reduce vibration of a flow-rate-ratio control valve due to exhaust vibration.

A control device for controlling an internal combustion engine according to the present disclosure is configured to control an internal combustion engine including an EGR device that includes:
  an EGR passage configured to connect an intake air passage of the internal combustion engine with an exhaust gas passage thereof;
  an EGR cooler arranged at the EGR passage;
  an EGR cooler bypass passage through which, when at least a part of EGR gas flowing through the EGR passage bypasses the EGR cooler, the at least a part of EGR gas flows; and
  a flow-rate-ratio control valve equipped with a valve disc and capable of controlling, by adjustment of an opening degree of the valve disc, a flow rate ratio of a flow rate of a cooler passing-through gas that is an EGR gas flowing through the EGR cooler and a flow rate of a bypass passing-through gas that is an EGR gas flowing through the EGR cooler bypass passage.

The control device is configured, when an opening degree control execution condition is met, to execute a vibration reduction control for controlling the flow-rate-ratio control valve such that the opening degree of the valve disc becomes greater than or equal to a vibration reduction opening degree that is greater than a minimum opening degree within an opening degree control range of the valve disc.

The opening degree control execution condition includes a requirement that a parameter that becomes greater when exhaust pulsation acting on the valve disc is greater is equal to or greater than a first threshold value.

The EGR device may include an EGR valve arranged in a portion of the EGR passage located on a downstream side of a collective portion between the cooler passing-through gas and the bypass passing-through gas. Also, the opening degree control execution condition may include a requirement that an opening degree of the EGR valve is equal to or smaller than a second threshold value in addition to the requirement that the parameter is equal to or greater than the first threshold value.

In comparison under a same engine operating condition, when the opening degree of the EGR valve is smaller, the vibration reduction opening degree may be greater than when the opening degree of the EGR valve is greater.

When the parameter is greater, the vibration reduction opening degree may be greater than when the parameter is smaller.

The control device may be configured to execute a temperature control for controlling the flow-rate-ratio control valve such that its target opening degree required to cause a temperature of the EGR gas introduced into the intake air passage from the EGR passage to approach a target EGR gas temperature is achieved. Also, when the opening degree control execution condition is met during the temperature control, the vibration reduction control may control the flow-rate-ratio control valve such that the opening degree of the valve disc approaches a greater opening degree of the target opening degree and the vibration reduction opening degree.

The vibration reduction opening degree may be greater than a maximum value of opening degrees at which chattering of the valve disc occurs.

According to the control device for an internal combustion engine of the present disclosure, when the opening degree control execution condition including a requirement that a parameter that becomes greater when exhaust pulsation acting on the valve disc is greater is equal to or greater than a first threshold value is met, the vibration reduction control is executed to control the flow-rate-ratio control valve such that the opening degree of the valve disc becomes greater than or equal to a vibration reduction opening degree that is greater than a minimum opening degree within an opening degree control range of the valve disc. As a result, when the opening degree control execution condition is met, the opening degree of the valve disc becomes greater than at least the minimum opening degree. This makes it possible to reduce the difference of pressures that act on each location of the valve disc due to the exhaust pulsation, as compared to at least an example in which the minimum opening degree is selected. Therefore, the vibration of the flow-rate-ratio control valve due to the exhaust pulsation can be reduced.

DETAILED DESCRIPTION

Figure 1:
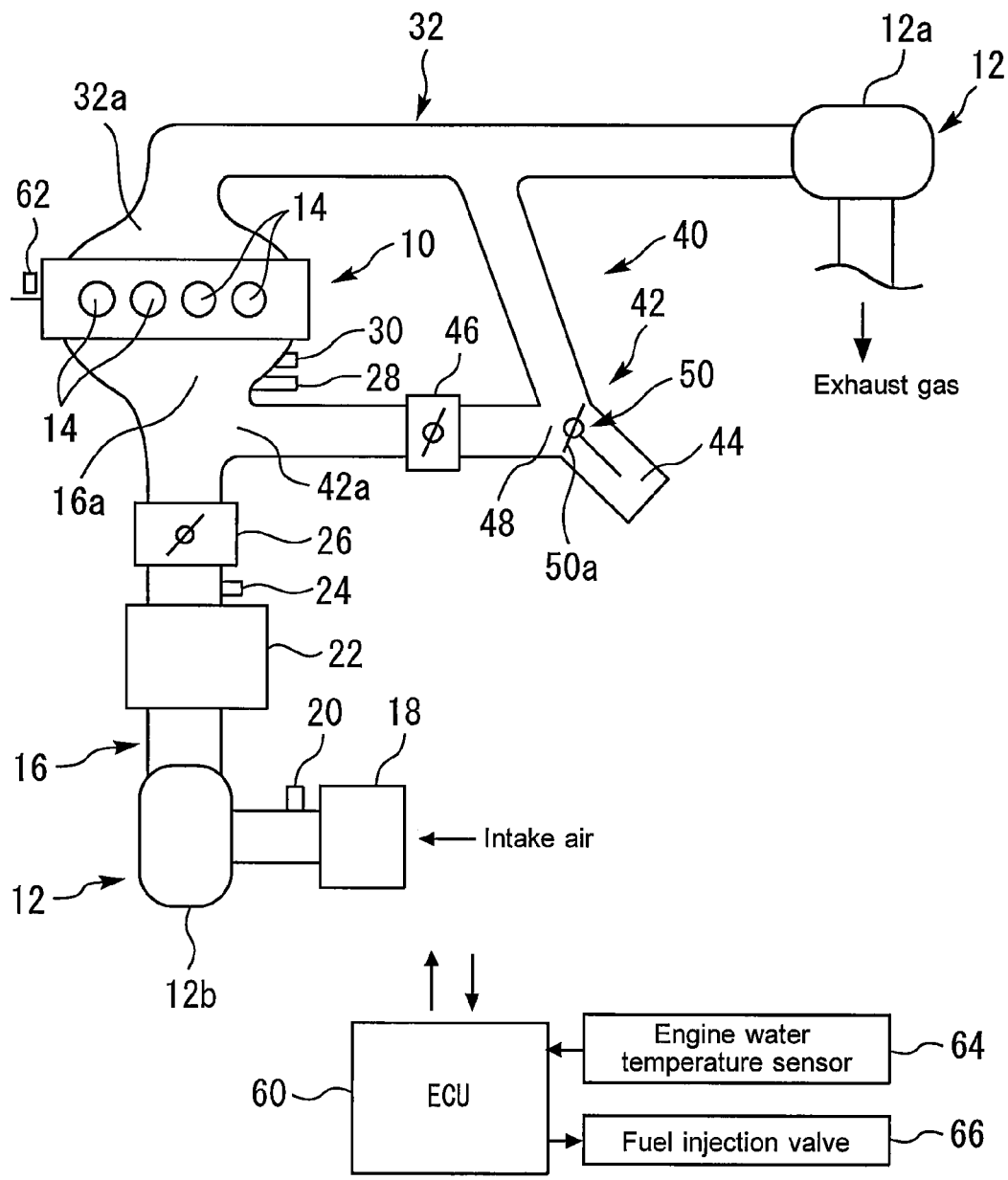
FIG. 1 is a schematic diagram for describing an example of a configuration of a system according to a first embodiment of the present disclosure.

In embodiments of the present disclosure described later, elements that are the same as each other in the drawings are denoted by the same reference symbols, and redundant descriptions of those elements will be omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Firstly, a first embodiment according to the present disclosure will be described with reference to FIGS. 1 to 8.
1-1. Example of Configuration of System FIG. 1 is a schematic diagram for describing an example of the configuration of a system according to the first embodiment of the present disclosure. The system shown in FIG. 1 includes an internal combustion engine (as an example, a diesel engine) 10. The internal combustion engine 10 is mounted on a vehicle, for example. Although the internal combustion engine 10 is, as an example, an in-line four cylinder engine, the number and arrangement of cylinders of the internal combustion engine 10 are not particularly limited.

The internal combustion engine 10 is a supercharged engine as an example. More specifically, the internal combustion engine 10 is provided with a turbo-supercharger 12 that includes a turbine 12a and a compressor 12b, as an example of a supercharger.

An intake air passage 16 communicates with each cylinder 14 of the internal combustion engine 10. In detail, an air cleaner 18 is provided in the vicinity of an inlet of the intake air passage 16. An air flow sensor 20 that outputs a signal responsive to the flow rate (fresh air flow rate Ga) of the air taken into the intake air passage 16 is installed downstream of the air cleaner 18.

The compressor 12b described above is arranged in a portion of the intake air passage 16 located on the downstream side of the air cleaner 18. A water-cooled intercooler 22 is installed in a portion of the intake air passage 16 located on the downstream side of the compressor 12b. The intercooler 22 is configured to cool the intake air (in the example shown in FIG. 1, the fresh air corresponds to this) compressed by the compressor 12b.

In the vicinity of the outlet of the intercooler 22, an intake air temperature sensor 24 that outputs a signal responsive to the temperature (fresh air temperature Ta) of the intake air (fresh air) that flows through this location is installed. Also, an electronically-driven throttle valve 26 capable of adjusting the flow rate of the intake air that flows through the intake air passage 16 is installed downstream of the intercooler 22. An intake air manifold 16a for distributing the intake air toward the individual cylinders 14 is arranged downstream of the throttle valve 26. Inner passages of the intake air manifold 16a serves as a part of the intake air passage 16.

In a collective portion of the intake manifold 16a, an intake air pressure sensor 28 that outputs a signal responsive to the pressure (boost pressure or intake manifold pressure) Pb of the intake air that flows through this location and an intake air temperature sensor 30 that outputs a signal responsive to the temperature (intake air temperature Tb) of the gas in the intake manifold 16a are installed. Moreover, an exhaust gas passage 32 communicates with each cylinder 14. Exhaust gases from the respective cylinders 14 are collected by an exhaust manifold 32a that includes inner passages that serve as a part of the exhaust gas passage 32. The turbine 12a described above is installed in a portion of the exhaust gas passage 32 located on the downstream side of the exhaust manifold 32a.

The internal combustion engine 10 shown in FIG. 1 further includes an EGR device 40. The EGR device 40 is of a high pressure loop (HPL) type, as an example. Thus, the EGR device 40 is equipped with an EGR passage 42 adapted to connect a portion of the exhaust gas passage 32 located on the upstream side of the turbine 12a and a portion of the intake air passage 16 located on the downstream side of the compressor 12b to each other. In more detail, in the example shown in FIG. 1, an EGR gas introduction port 42a with respect to the intake air passage 16 is provided at a location that is on the downstream side of both the intercooler 22 and throttle valve 26.

Figure 2:
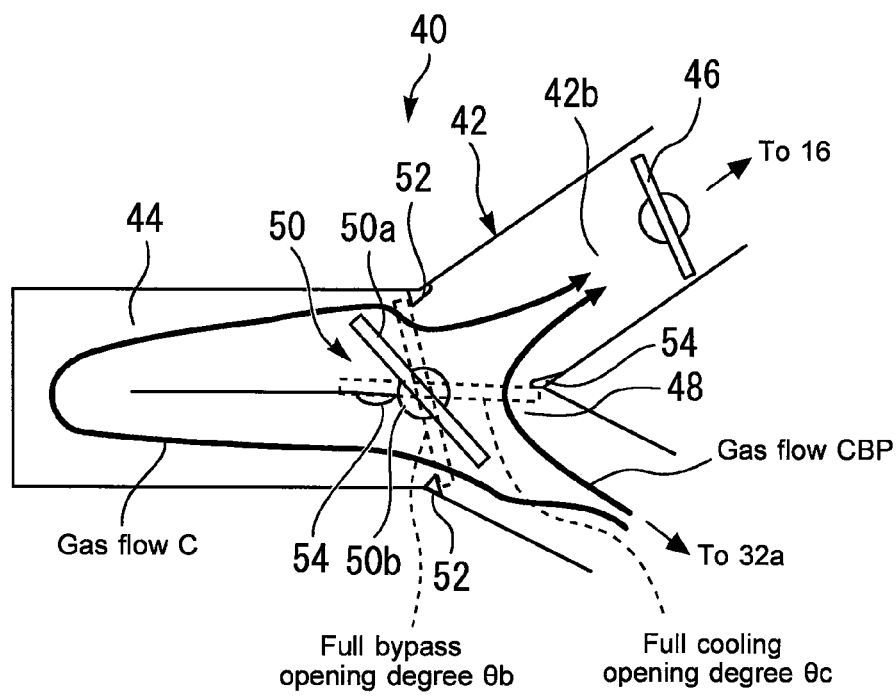
FIG. 2 is an enlarged view that schematically illustrates a main part of an EGR device 40 shown in FIG. 1.

FIG. 2 is an enlarged view that schematically illustrates a main part of the EGR device 40 shown in FIG. 1. An EGR cooler 44 and an EGR valve 46 are installed in the EGR passage 42. The EGR cooler 44 is provided to cool the EGR gas that flows through the EGR passage 42. The EGR valve 46 is provided to adjust the amount of the EGR gas introduced into the intake air passage 16 via the EGR passage 42.

The EGR device 40 is further equipped with an EGR cooler bypass passage 48 (hereunder, simply abbreviated as a "bypass passage 48") and a flow-rate-ratio control valve 50. As an example, the flow-rate-ratio control valve 50 is installed at an end portion of the EGR cooler 44 and includes a valve disc 50a (so-called butterfly valve) and a valve shaft 50b. The valve shaft 50b corresponds to the rotation axis of the valve disc 50a.

The flow-rate-ratio control valve 50 is configured to be able to control, by adjustment of the opening degree θ of the valve disc 50a, the flow rate ratio of the flow rate of EGR gas flowing through the EGR cooler 44 (hereunder, referred to as a "cooler passing-through gas") and the flow rate of EGR gas flowing through the bypass passage 48 (hereunder, referred to as a "bypass passing-through gas"). It should be noted that an "EGR cooler ratio R (i.e., a ratio of a cooler passing-through gas flow rate with respect to the total EGR gas flow rate (i.e., the sum of the cooler passing-through gas flow rate and the bypass passing-through gas flow rate) Gegr" is used in the example of the temperature control described later.

To be more specific, the flow-rate-ratio control valve 50 is configured to be able to continuously change the opening degree θ of the valve disc 50a for the control of the EGR cooler ratio R. To achieve this, the flow-rate-ratio control valve 50 is driven by a vacuum regulating valve (VRV) of diaphragm type, or an electric motor, as an example. The opening degree θ of the valve disc 50a depicted by the solid line in FIG. 2 represents an example of intermediate opening degrees.

As shown in FIG. 2, an opening degree control range of the valve disc 50a is a range from a full bypass opening degree θb to a full cooling opening degree θc. The full bypass opening degree θb mentioned here corresponds to an opening degree that corresponds to a full bypass state in which the flow rate of the cooler passing-through gas becomes zero (i.e., EGR cooler ratio R=0). Also, the full cooling opening degree θc corresponds to an opening degree that corresponds to a full cooling state in which the total amount of the EGR gas introduced into the EGR passage 42 passes through the EGR cooler 44 (i.e., EGR cooler ratio R=1).

A pair of valve seats 52 and a pair of valve seats 54 are arranged in the EGR passage 42. As shown in FIG. 2, the valve disc 50a is seated on the pair of valve seats 52 when the full bypass opening degree θb is selected, and the valve disc 50a is seated on the pair of valve seats 54 when the full cooling opening degree θc is selected.

As shown by an arrow in FIG. 2, in the full bypass state that is achieved by the full bypass opening degree θb, only a flow of the bypass passing-through gas (i.e., gas flow CBP) is formed because the total amount of the EGR gas does not pass through the EGR cooler 44 and passes through the bypass passage 48. On the other hand, in the full cooling state that is achieved by the full cooling opening degree θc, only a flow of the cooler passing-through gas (i.e., gas flow C) is formed because the total amount of the EGR gas does not pass through the bypass passage 48 and passes through the EGR cooler 44. Also, when an arbitrary intermediate opening degree is selected, the gas flow CBP and the gas flow C that depend on the flow rate according to a selected intermediate opening degree are formed.

In addition, in the example of the configuration of the EGR device 40 shown in FIG. 2, the bypass passage 48 is arranged so as to be included in the EGR passage 42 (in other words, both are formed integrally). That is to say, as a result of an opening degree other than the full cooling opening degree θc being selected, the bypass passage 48 is formed in the EGR passage 42 when a gas between the valve disc 50a and the valve seats 54 on the non-EGR-cooler side is produced. In this way, the bypass passage 48 corresponds to a passage through which, when at least a part of the EGR gas flowing through the EGR passage 42 bypasses the EGR cooler 44 as a result of an opening degree adjustment for the valve disc 50a, the at least a part of the EGR gas flows. Also, in this configuration example, when the full bypass opening degree θb is selected, a space (internal space of the EGR cooler 44) that is separated from the EGR gas flow (gas flow CBP) is formed.

Furthermore, as shown in FIG. 2, the EGR valve 46 is arranged in a portion of the EGR passage 42 located on the downstream side of a collective portion 42b of the cooler passing-through gas and the bypass passing-through gas.

As shown in FIG. 1, the system according to the present embodiment is further provided with an electronic control unit (ECU) 60. Various sensors installed in the internal combustion engine 10 and the vehicle on which the internal combustion engine 10 is mounted and various actuators for controlling the operation of the internal combustion engine 10 are electrically connected to the ECU 60.

The various sensors described above include a crank angle sensor 62 and an engine cooling water temperature sensor 64, in addition to the air flow sensor 20, the intake air temperature sensors 24 and 30, and the intake air pressure sensor 28 that are described above. The crank angle sensor 62 outputs a signal responsive to the crank angle. The ECU 60 can calculate an engine speed Ne by the use of the signals of the crank angle sensor 62. The engine water temperature sensor 64 outputs a signal responsive to engine water temperature Tw. Moreover, the various actuators described above include fuel injection valves 66, as well as the throttle valve 26, the EGR valve 46 and the flow-rate-ratio control valve 50 that are described above.

The ECU 40 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device for an internal combustion engine" according to the present embodiment are achieved.

1-2. Control of Flow-Rate-Ratio Control Valve According to First Embodiment 1-2-1. One Example of Temperature Control Using Flow-Rate-Ratio Control Valve According to the present embodiment, as an example of the "temperature control" concerning the EGR gas temperature by using the flow-rate-ratio control valve 50, the following intake air temperature control is performed. This intake air temperature control is performed to cause the actual intake air temperature Tb to approach a target intake air temperature Tbt by controlling the opening degree θ of the valve disc 50a of the flow-rate-ratio control valve 50 such that, during execution of an EGR gas introduction operation, the actual EGR gas temperature Tegr approaches a target EGR gas temperature Tegrt. An example of the intake air temperature Tb targeted for this intake air temperature control is the temperature of the gas in the intake manifold 16a.

To be more specific, according to the intake air temperature control described above, the target EGR gas temperature Tegrt that satisfies the target intake air temperature Tbt is calculated. Also, the opening degree θ of the valve disc 50a is adjusted so as to be a target opening degree θt that corresponds to a required value of the EGR cooler ratio R (required EGR cooler ratio Rt) that achieves a calculated target EGR gas temperature Tegrt. Consequently, the actual EGR gas temperature Tegr approaches the target EGR gas temperature Tegrt, and, as a result, the actual intake air temperature Tb can be caused to approach the target intake air temperature Tbt.

It should be noted that the opening degree adjustment according to the intake air temperature control can be performed as follows, for example. That is, a map of the target opening degree θt of the valve disc 50a associated with the required EGR cooler ratio Rt is stored in the ECU 60 in advance. The valve disc 50a is controlled so as to have the target opening degree θt calculated from this map. In addition, the target intake air temperature Tbt can be, for example, calculated, by the use of a map or a relation formula, as a value depending on the engine operating condition (such as, fuel injection amount q (engine torque), engine speed Ne and engine water temperature Tw). The target EGR gas temperature Tegrt can be, for example, calculated, by the use of a map or a relation formula, as a value depending on the target intake air temperature Tbt, the fresh air flow rate Ga, the fresh air temperature Ta and the total EGR gas flow rate Gegr.

1-2-2. Problem Concerning Flow-Rate-Ratio Control Valve

Figure 3:
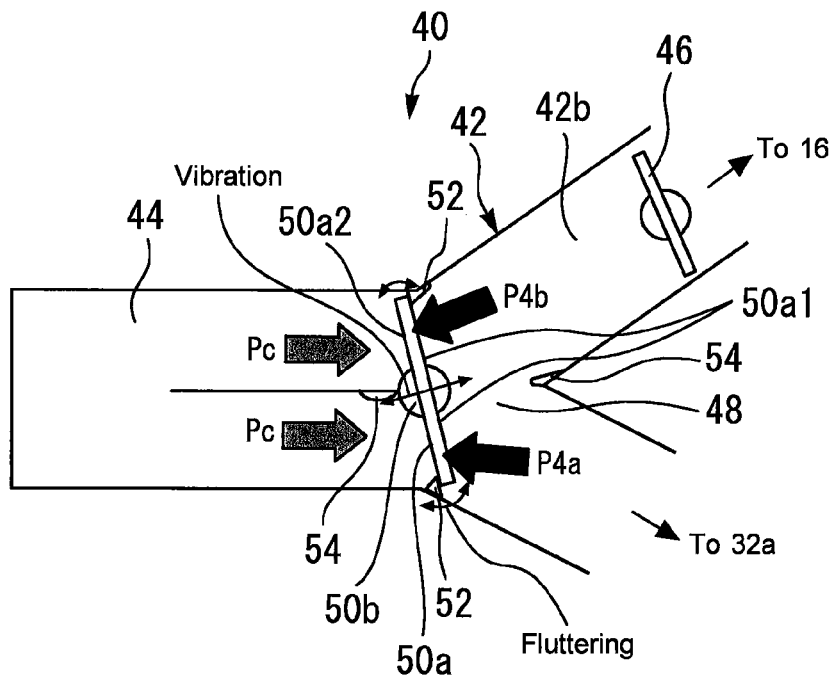
FIG. 3 is a schematic diagram for describing pressures P4a, P4b and Pc that act on a valve disc in a state in which a flow-rate-ratio control valve is controlled to a full bypass opening degree θb.

FIG. 3 is a schematic diagram for describing pressures P4a, P4b and Pc that act on the valve disc 50a in a state in which the flow-rate-ratio control valve 50 is controlled to the full bypass opening degree θb. The flow-rate-ratio control valve 50 is affected by exhaust pulsation (exhaust pressure pulsation) since it is installed in a passage through which the EGR gas flows (in the example shown in FIG. 3, EGR passage 42).

The surface of the valve disc 50a located on a non-EGR-cooler side is referred to as a "surface 50a1", and the surface of the valve disc 50a located on an EGR-cooler side is referred to as a "surface 50a2". The pressure P4a is a value of the EGR gas pressure (exhaust gas pressure) that acts on the surface 50a1 at a portion of the surface 50a1 located on the upstream side relative to the valve shaft 50b in the EGR gas flow (gas flow CBP shown in FIG. 2). The pressure P4b is a value of the EGR gas pressure (exhaust gas pressure) that acts on the surface 50a1 at a portion of the surface 50a1 located on the downstream side relative to the valve shaft 50b in the EGR gas flow. The pressure Pc is a value of the pressure of EGR gas that acts on the surface 50a2. The magnitude of the pressures P4a and P4b are substantially equal to the pressure of the gas in the exhaust manifold 16a.

Figure 4:
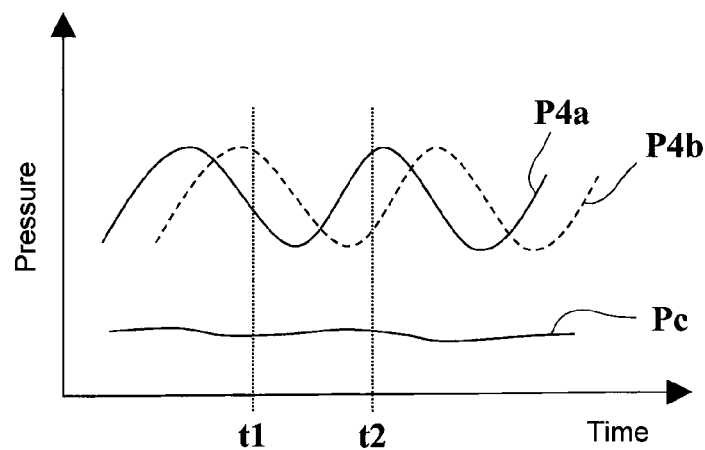
FIG. 4 is a graph that illustrates time waveforms of the pressures P4a, P4b and Pc shown in FIG. 3.

FIG. 4 is a graph that illustrates time waveforms of the pressures P4a, P4b and Pc shown in FIG. 3. The exhaust pulsation propagates from the upstream side (i.e., side of the exhaust manifold 32a). Thus, the timings at which a pressure wave of the exhaust pulsation reaches the individual parts on the surface 50a1 of the valve disc 50a become different from each other depending on positions on the surface 50a1.

Moreover, the pressure wave of the exhaust pulsation that acts on the valve disc 50a includes a reflected wave that is generated as a result of reflection at the EGR valve 46. The timings at which this reflected wave reaches the individual parts on the surface 50a1 also become different from each other depending on positions on the surface 50a1.

Based on the above, although the amplitudes of the pressures P4a and P4b are substantially equal to each other, a phase difference is produced between the waveforms of the pressures P4a and P4b as shown in FIG. 4. In addition, since the pressure Pc is equivalent to the pressure in a space closed as a result of selection of the full bypass opening degree θb, the waveform of the pressure Pc is less fluctuated as shown in FIG. 4 and the pressure Pc is lower than the pressures P4a and P4b.

If the pressures P4a, P4b and Pc as described above acts on the valve disc 50a due to the effect of the exhaust pulsation, the vibration is generated at the flow-rate-ratio control valve 50 as described below. It should be noted that a problem concerning the vibration described below may occur not only a state in which the full bypass opening degree θb is selected (that is, state in which the valve disc 50a is seated on the valve seats 52) but also a state in which an opening degree closer to the full bypass opening degree θb is selected.

1-2-2-1. Vibration of Valve Disc (Fluttering)

When the pressures P4a and P4b accompanied by the phase difference as described above act on the same surface 50a1 of the valve disc 50a in such a manner that the valve shaft 50b is interposed between the pressures P4a and P4b, the vibration of the valve disc 50a occurs. To be more specific, due to the phase difference described above, the magnitude relationship between the pressures P4a and P4b repeatedly changes with a lapse of time (for example, time points t1 and t2 in FIG. 4). As a result, the magnitude relationship between a pressure difference (P4a-Pc) between the pressures P4a and P4b, and a pressure difference (P4b-Pc) between the Pressures P4a and Pc also repeatedly changes with a lapse of time.

If the surface 50a1 is pushed by a load depending on the pressure differences (P4a-Pc) and (P4b-Pc) whose magnitude relationships repeatedly change as described above, the valve disc 50a rotates around the valve shaft 50b and thereby opens and closes repeatedly. That is to say, the vibration mentioned here corresponds to fluttering of the valve disc 50a (operation of repeatedly opening and closing within a minute operation range). Also, the occurrence of this kind of fluttering of the valve disc 50a causes a phenomenon (that is, chattering) in which the valve disc 50a beats the valve seats 52.

1-2-2-2. Radial Vibration of Valve Shaft

Moreover, the vibrations that may occur associated with the effect of the pressures P4a, P4b and Pc to the valve disc 50a include not only the fluttering of the valve disc 50a described above but also a radial vibration of the valve shaft 50b as described below. That is, as described above, as compared to the pressures P4a and P4b that act on the surface 50a1 of the valve disc 50a, the pressure Pc that acts on the surface 50a2 on the side opposite thereto is smaller. In addition, the pressures P4a and P4b periodically vary with different phase differences from each other. Thus, with respect to a radial direction of the valve shaft 50b, a load whose magnitude changes with a lapse of time (i.e., cyclic load) acts from the side of the surface 50a1 (side of the bypass passage 48) to the side of the surface 50a2 (side of the EGR cooler 44). As a result, the valve shaft 50b vibrates in its radial direction.

1-2-3. Vibration Reduction Control

According to the present embodiment, in view of the problem described above, a "vibration reduction control" for reducing the vibration described above of the valve disc 50 (i.e., the fluttering of the valve disc 50a and the radial vibration of the valve shaft 50b) is performed when the following "opening degree control execution condition" is met during the "temperature control (intake air temperature control)" described above.

1-2-3-1. One Example of Opening Degree Control Execution Condition

The vibration described above of the flow-rate-ratio control valve 50 becomes greater because, when the exhaust pulsation that acts on the valve disc 50a is greater, the load that acts on the valve disc 50a becomes greater. Accordingly, the opening degree control execution condition described above includes a requirement that a "parameter" that becomes greater when the exhaust pulsation that acts on the valve disc 50a is greater is equal to or greater than a "first threshold value". One example of the aforementioned parameter used in the present embodiment is a pulsation level value described below with reference to FIG. 5. It should be noted that the pulsation level value is supposed to be a value that becomes greater when the magnitude (amplitude) of the exhaust pulsation is greater.

Figure 5:
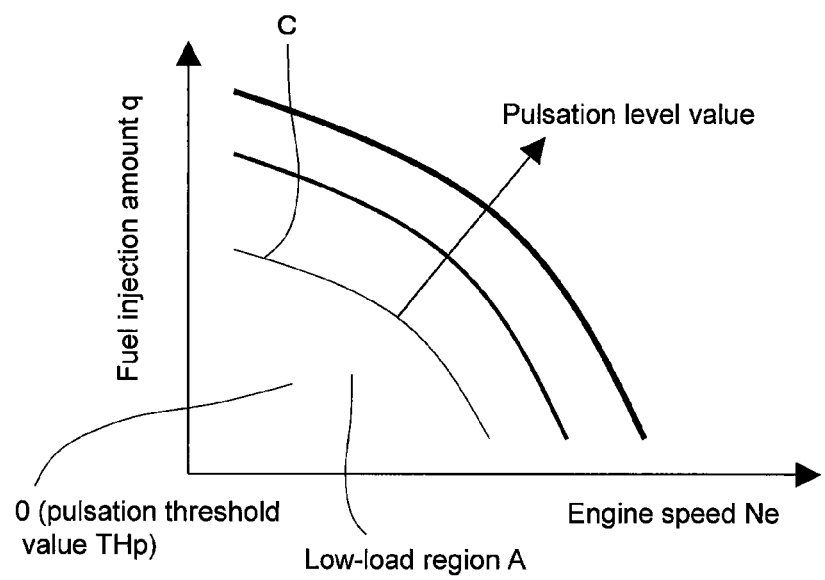
FIG. 5 is a graph that illustrates an example of a relationship between an engine operating condition (fuel injection amount q and engine speed Ne) and a pulsation level value.

FIG. 5 is a graph that illustrates an example of a relationship between the engine operating condition (fuel injection amount q and engine speed Ne) and the pulsation level value. The higher the engine load is, the higher the exhaust manifold pressure becomes. The exhaust pulsation (amplitude thereof) thus basically becomes greater when the engine load is higher. In addition, if the exhaust pulsation is greater, the difference of the pressures P4a and P4b that act on the surface 50a1 of the valve disc 50a with the phase difference as described above becomes greater at each time point. Thus, when the exhaust pulsation is greater, the problem of the vibration described above occurs more prominently. If, on the other hand, the exhaust pulsation is too small, the problem described above becomes difficult to occur.

Accordingly, according to the relationship shown in FIG. 5, the pulsation level value in a low-load region A in which the fuel injection amount q that is correlated with the engine load is less (i.e., region located on the lower-load and lower-speed side relative to a curve C) is set to zero. According to the present embodiment, the pulsation level value in this low-load region A (that is, zero) corresponds to an example of the first threshold value described above, and is hereunder referred to as a "threshold value THp".

Moreover, in a region located on the higher-load and higher-speed side relative to this low-load region A, the pulsation level value under the same engine speed Ne is set to be greater when the fuel injection amount q is greater (i.e., when the engine load is higher). Accordingly, the opening degree control execution condition according to the present embodiment is set to include a requirement that the pulsation level value is equal to or greater than the threshold value THp.

Furthermore, when the opening degree of the EGR valve 46 is smaller, the pressure wave of a pulsation that propagates from the side of the exhaust manifold 32a into the EGR passage 42 becomes difficult to be released outside. Thus, since, when the opening degree of the EGR valve 46 is smaller, the pressure wave (reflected wave) that is reflected by the EGR valve 46 returns back toward the valve disc 50a without less attenuation, the effect of the exhaust pulsation to the valve disc 50a become greater. The above-described vibration of the flow-rate-ratio control valve 50 easily becomes greater when the opening degree of the EGR valve 46 is smaller.

Accordingly, the opening degree control execution condition used in the present embodiment includes not only the requirement that the pulsation level value is equal to or greater than the threshold value THp but also a requirement that the opening degree of the EGR valve 46 is equal to or smaller than a threshold value THegr. It should be noted that the threshold value THegr corresponds to an example of a "second threshold value" according to the present disclosure.

1-2-3-2. One Example of Vibration Reduction Control

According to the vibration reduction control of the present embodiment, the flow-rate-ratio control valve 50 is controlled such that, when the opening degree control execution condition described above is met, the opening degree $\theta$ of the valve disc 50a becomes equal to or greater than a vibration reduction opening degree $\theta v$ that is greater than the full bypass opening degree $\theta b$. It should be noted that the full bypass opening degree $\theta b$ of the valve disc 50a corresponds to an example of the "minimum opening degree within an opening degree control range of a valve disc" according to the present disclosure, and the vibration reduction opening degree $\theta v$ corresponds to an example of the "vibration reduction opening degree" according to the present disclosure.

To be more specific, according to the vibration reduction control of the present embodiment, it is determined, when the opening degree control execution condition is met, which of the target opening degree $\theta t$ of the valve disc 50a used in the temperature control described above and the vibration reduction opening degree $\theta v$ is greater. Also, the flow-rate-ratio control valve 50 is controlled so as to have a greater opening degree of them. This makes it possible to control the flow-rate-ratio control valve 50 such that the opening degree $\theta$ of the valve disc 50a becomes equal to or greater than the vibration reduction opening degree $\theta v$.

Figure 6A:
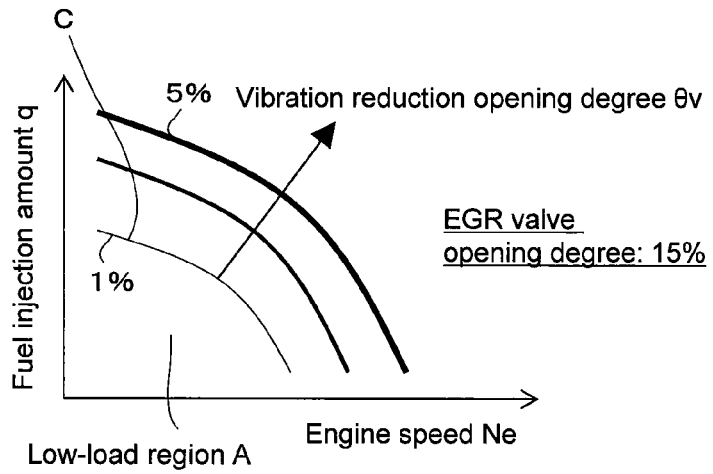
FIGS. 6A to 6C are graphs that illustrate examples of a setting of a vibration reduction opening degree θv depending on the opening degree of an EGR valve.
Figure 6B:
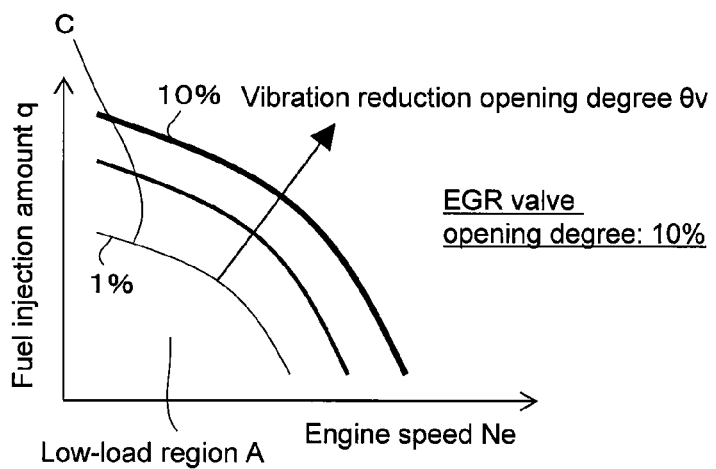
Figure 6C:
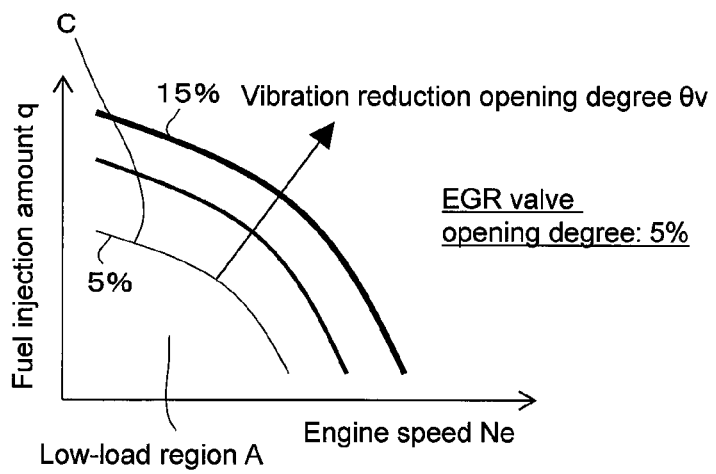

FIGS. 6A to 6C are graphs that illustrate examples of the setting of the vibration reduction opening degree $\theta v$ depending on the opening degree of the EGR valve 46. It should be noted that, in the present embodiment, the full bypass opening degree $\theta b$ corresponds to 0% and the full cooling opening degree $\theta c$ corresponds to 100%. In addition, with respect to the opening degree of the EGR valve 46, a full close degree corresponds to 0%, and a maximum opening degree (i.e., opening degree obtained when the EGR valve 46 is most widely opened) corresponds to 100%.

The vibration reduction opening degree $\theta v$ is a value determined as a value of the opening degree $\theta$ that is required to reduce the vibration described above. In more detail, according to the present embodiment, the vibration reduction opening degree $\theta v$ is determined, as an example, so as to be equal to an opening degree that is greater than a maximum value of opening degrees at which the chattering of the valve disc 50a occurs.

Moreover, as described above, when the opening degree of the EGR valve 46 is smaller, the problem described above occurs more prominently. Accordingly, in the present embodiment, the vibration reduction opening degree $\theta v$ is determined so as to become different depending on the opening degree of the EGR valve 46 as described below. Also, it is supposed that one example of the threshold value THegr concerning the EGR valve 46 used for the opening degree control execution condition according to the present embodiment is 15%. The vibration reduction control according to the present embodiment is thus performed when the opening degree of the EGR valve 46 is equal to or smaller than 15%.

FIG. 6A corresponds to an example of the setting of the vibration reduction opening degree θv used when the opening degree of the EGR valve 46 is controlled within a range that is greater than 10% and equal to or smaller than 15%. As shown in FIG. 6A, when the opening degree of the EGR valve 46 is 15%, the lower limit value of the vibration reduction opening degree θv is set to 1% that is greater than the minimum opening degree (0%). Also, in the region located on the higher-load and higher-speed region relative to the low load region A (that is, a target region of the vibration reduction control), the vibration reduction opening degree θv under the same engine speed Ne is set to be greater when the fuel injection amount q is greater (that is, the engine load is higher). The upper limit value of the vibration reduction opening degree θv is 5%.

FIG. 6B corresponds to an example of the setting of the vibration reduction opening degree θv used when the opening degree of the EGR valve 46 is controlled within a range that is greater than 5% and equal to or smaller than 10%. As shown in FIG. 6B, when the opening degree of the EGR valve 46 is 10%, the lower limit value of the vibration reduction opening degree θv is also set to 1% that is greater than the minimum opening degree (0%). Also, similarly to the setting shown in FIG. 6A, the vibration reduction opening degree θv under the same engine speed Ne is set to be greater when the fuel injection amount q is greater. The upper limit value of the vibration reduction opening degree θv is 10% that is greater than that of the setting shown in FIG. 6A.

FIG. 6C corresponds to an example of the setting of the vibration reduction opening degree θv used when the opening degree of the EGR valve 46 is controlled within a range that is equal to or greater than 0% and equal to or smaller than 5%. As shown in FIG. 6C, when the opening degree of the EGR valve 46 is 5%, the lower limit value of the vibration reduction opening degree θv is set to 5% that is greater than the minimum opening degree (0%) and also greater than the values according to the settings shown in FIGS. 6A and 6B. Also, similarly to the settings shown in FIGS. 6A and 6B, the vibration reduction opening degree θv under the same engine speed Ne is set to be greater when the fuel injection amount q is greater. The upper limit value of the vibration reduction opening degree θv is 15% that is greater than that of the setting shown in FIG. 6B.

The following can be said from the settings shown in FIGS. 6A to 6C described above. That is, in comparison under the same engine operating condition (mainly, fuel injection amount q and engine speed Ne), when the opening degree of the EGR valve 46 is smaller, the vibration reduction opening degree θv becomes greater than when the opening degree of the EGR valve 46 is greater.

Furthermore, as can be seen by referring to FIG. 5 and each of the settings shown in FIGS. 6A to 6C, when the pulsation level value is greater (that is, when the exhaust pulsation is greater), the vibration reduction opening degree θv becomes greater than when the pulsation level value is smaller.

1-2-4. Processing of ECU Concerning Control of Flow-Rate-Ratio Control Valve (Mainly, Vibration Reduction Control)

Figure 7:
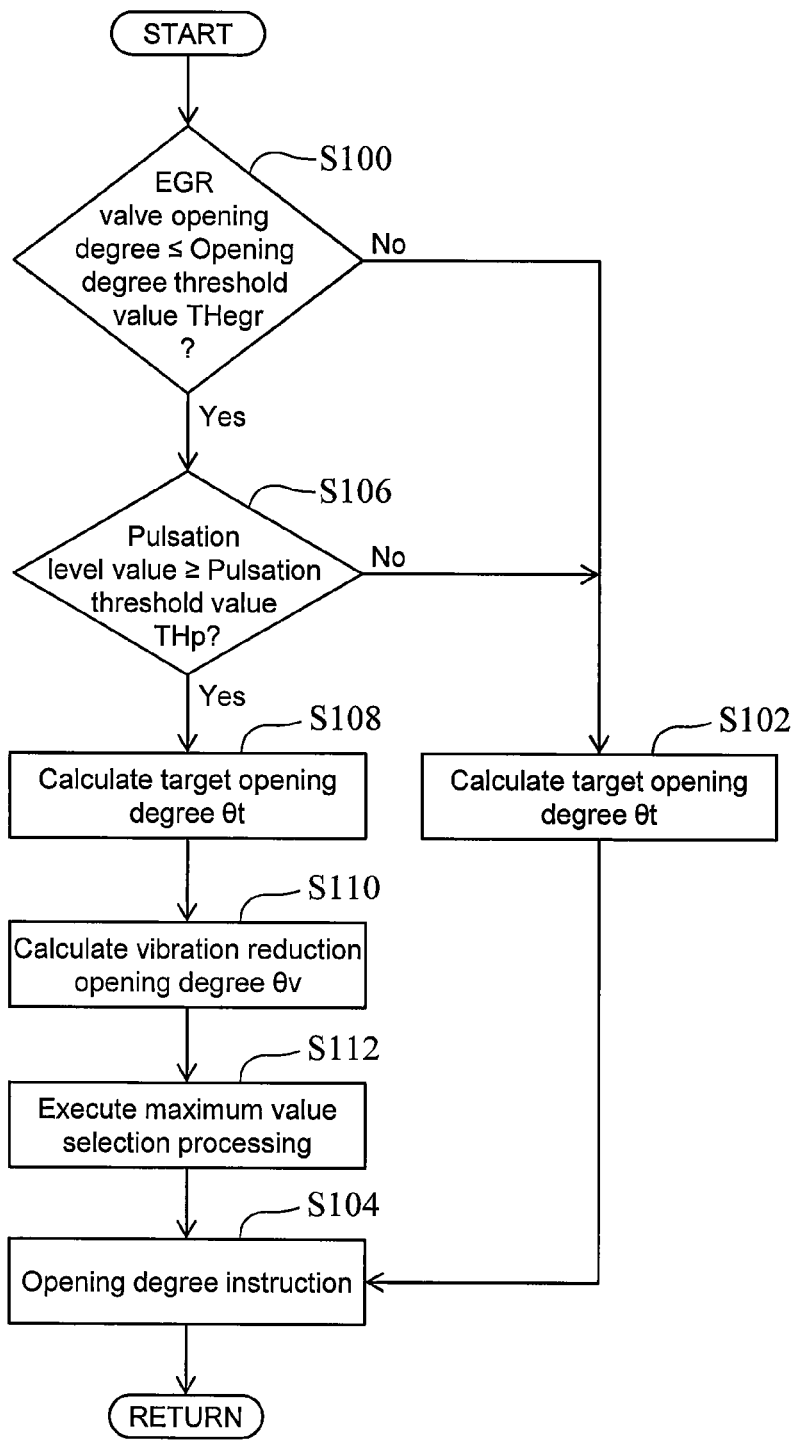
FIG. 7 is a flow chart that illustrates a routine of a processing concerning a control of a flow-rate-ratio control valve according to the first embodiment of the present disclosure.

FIG. 7 is a flow chart that illustrates a routine of the processing concerning the control of the flow-rate-ratio control valve 50 according to the first embodiment of the present disclosure. The ECU 60 repeatedly executes the present routine at a designated time interval during operation of the internal combustion engine 10.

As shown in FIG. 7, firstly, the ECU 60 determines whether or not the opening degree of the EGR valve 46 is equal to or smaller than the threshold value THegr (for example, 15%) (step S100). As a result, is the determination result of step S100 is negative, the ECU 60 proceeds to step S102.

In step S102, the ECUC 60 calculates the target opening degree θt of the temperature control (intake air temperature control) described above. An example of the calculation method of the target opening degree θt is as already described. Then, the ECU 60 instructs the flow-rate-ratio control valve 50 to have a calculated target opening degree θt (step S104). As a result, the flow-rate-ratio control valve 50 is driven so as to have the target opening degree θt.

If, on the other hand, the determination result of step S100 is positive, the ECU 60 proceeds to step S106. In step S106, the ECU 60 determines whether or not the pulsation level value is equal to or greater than the threshold value THp (for example, zero). The ECU 60 stores a map that defines a relationship between the engine operating condition (fuel injection amount q and engine speed Ne) and the pulsation level value as in the relationship shown in FIG. 5. The ECU 60 calculates, from this kind of map, the pulsation level value depending on the current engine operating condition.

If the determination result of step S106 is negative, the ECU 60 proceeds to step S102. If, on the other hand, the determination result of step S106 is positive, that is, if it can be judged that the opening degree control execution condition used in the present embodiment is met, the ECU 60 proceeds to step S108 to calculate the target opening degree θt. The processing itself of step S108 is the same as that of step S102.

Next, the ECU 60 calculates the vibration reduction opening degree θv (step S110). The ECU 60 stores a map that defines a relationship between the engine operating condition (fuel injection amount q and engine speed Ne), the opening degree of the EGR valve 46, and the vibration reduction opening degree θv, as in the relationships shown in FIGS. 6A to 6C. The ECU 60 calculates, from this kind of map, the vibration reduction opening degree θv depending on the current operating condition and the opening degree of the EGR valve 46.

Next, the ECU 60 executes a maximum value selection processing that selects a greater value of the target opening degree θt and the vibration reduction opening degree θv that are calculated in steps S108 and S110 (step S112). According to this maximum value selection processing, the target opening degree θt is selected when the target opening degree θt is equal to or greater than the vibration reduction opening degree θv, and, on the other hand, the vibration reduction opening degree θv is selected when the target opening degree θt is smaller than the vibration reduction opening degree θv. Then, the ECU 60 instructs the flow-rate-ratio control valve 50 to have a target opening degree θt or vibration reduction opening degree θv that has been selected (step S104).

1-2-5. Advantageous Effects Concerning Control of Flow-Rate-Ratio Control Valve (Vibration Reduction Control)

As described so far, according to the control of the flow-rate-ratio control valve 50 of the present embodiment, the vibration reduction control is executed when the opening degree control execution condition is met (EGR valve opening degree≤THegr, and Pulsation level value≥THp). According to the vibration reduction control, the opening degree θ of the valve disc 50a that is selected when the opening degree control execution condition is met is limited so as to be equal to or greater than the vibration reduction opening degree θv.

Figure 8:
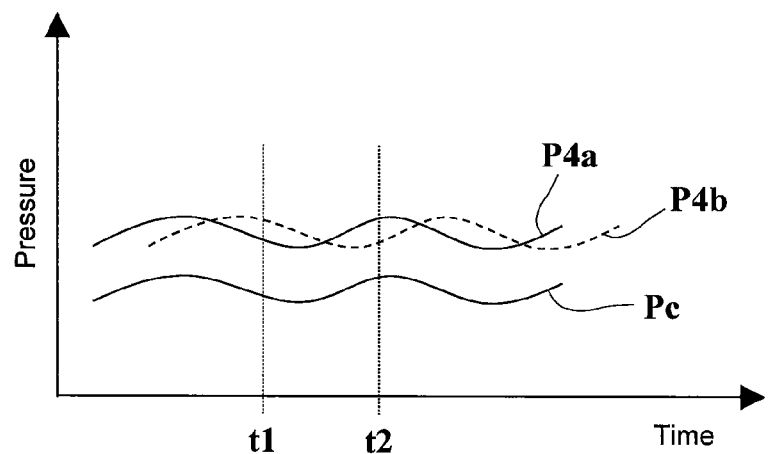
FIG. 8 is a graph for describing advantageous effects concerning a vibration reduction control that is executed for the valve disc of the flow-rate-ratio control valve shown in FIG. 2.

FIG. 8 is a graph for describing advantageous effects concerning the vibration reduction control that is executed for the valve disc 50a of the flow-rate-ratio control valve 50 shown in FIG. 2. FIG. 8 represents time waveforms of the pressures P4a, P4b and Pc acquired when the vibration reduction control opens the valve disc 50a to its opening degree θ that is equal to or greater than the vibration reduction opening degree θv under a condition that the exhaust pulsation whose magnitude is the same as that of the waveforms shown in FIG. 4 described above propagates in the EGR passage 42.

When the valve disc 50a opens to its opening degree θ that is equal to or greater than the vibration reduction opening degree θv, the flow rate of the cooler passing-through gas increases. As a result, as shown in FIG. 8, the pressure Pc on the side of the EGR cooler 44 increases, and the amplitudes of the pressures P4a and P4b decrease. Because of this, since the pressure difference (P4a-Pc) and the pressure difference (P4b-Pc) at each time point decrease, the load that acts on the surface 50a1 of the valve disc 50a becomes smaller. Therefore, even when the magnitude relationship between these pressure differences repeatedly changes, the vibration (fluttering) of the valve disc 50a is more reduced. Also, the vibration reduction opening degree θv used in the present embodiment is determined so as to be equal to an opening degree that is greater than the maximum value of opening degrees at which the chattering of the valve disc 50a occurs. Therefore, according to the vibration reduction control, the fluttering of the valve disc 50a can be reduced to favorably avoid the chattering.

Moreover, according to the vibration reduction control, since the pressure difference (P4a-Pc) and the pressure difference (P4b-Pc) at each time point decrease as described above, the cyclic load that acts on the valve shaft 50b in its radial direction is decreased. Thus, the radial vibration of the valve shaft 50b can also be effectively reduced.

In addition, in order to reduce the above-described vibration of the flow-rate-ratio control valve 50, it is also conceivable to form a notch in the valve disc 50a. However, when this kind of countermeasures are taken, the valve disc 50a cannot be closed up also under a condition that the reduction of the vibration is not required. In contrast to this, according to the vibration reduction control of the present embodiment, the occurrence of flow of the cooler passing-through gas can be avoided due to an increase of the opening degree θ of the valve disc 50a under a condition that the reduction of the vibration is not required, and the vibration can be reduced due to the increase of the opening degree θ of the valve disc 50a only when the reduction of the vibration is required.

Moreover, the opening degree control execution condition according to the present embodiment includes not only the requirement that the pulsation level value is equal to or greater than the threshold value THp but also the requirement that the opening degree of the EGR valve 46 is equal to or smaller than the threshold value THegr. This makes it possible to more clearly determine the condition that the problem of the vibration occurs prominently due to the opening degree of the EGR valve 46 being small. The vibration reduction control can thus be executed efficiently (i.e., without waste).

Moreover, when the opening degree of the EGR valve 46 is smaller, the problem of the vibration described above occurs more prominently. According to the vibration reduction control of the present embodiment, in comparison under the same engine operating condition, when the opening degree of the EGR valve 46 is smaller, the vibration reduction opening degree θv becomes greater than when the opening degree of the EGR valve 46 is greater. Therefore, the value of the vibration reduction opening degree θv that is necessary to reduce the vibration described above can be set more properly in accordance with the control state of the opening degree of the EGR valve 46.

Furthermore, when the magnitude (amplitude) of the exhaust pulsation is greater, the problem of the vibration described above occurs more prominently. According to the vibration reduction control of the present embodiment, when the pulsation level value is greater (that is, when the exhaust pulsation is greater), the vibration reduction opening degree θv is set to be greater than when the pulsation level value is smaller. Because of this, the value of the vibration reduction opening degree θv can be set more properly in accordance with the magnitude of the exhaust pulsation.

Second Embodiment

Next, a second embodiment according to the present disclosure will be described with reference to FIGS. 9 to 12.

2-1. Example of Configuration of EGR Device

Figure 9:
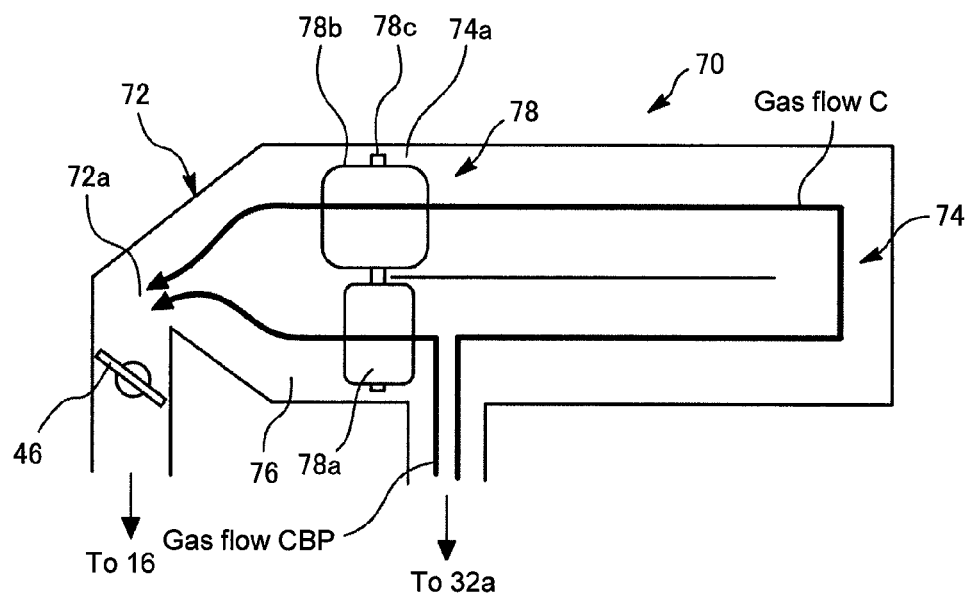
FIG. 9 is an enlarged view that schematically illustrates a main part of an EGR device of an internal combustion engine according to a second embodiment of the present disclosure.

An example of the system configuration according to the second embodiment is different from the configuration shown in FIG. 1 in terms of the following EGR device 70 shown in FIG. 9 being provided instead of the EGR device 40. Also, the EGR device 70 according to the present embodiment is different from the EGR device 40 in terms of a point described below.

FIG. 9 is an enlarged view that schematically illustrates a main part of the EGR device 70 of an internal combustion engine according to the second embodiment of the present disclosure. As shown in FIG. 9, the EGR device 70 is equipped with an EGR passage 72, an EGR cooler 74, an EGR cooler bypass passage 76 and a flow-rate-ratio control valve 78 in addition to the EGR valve 46.

The flow-rate-ratio control valve 78 includes two valve discs 78a and 78b (butterfly valve) arranged on the same valve shaft 78c. The valve disc 78a is installed in the bypass passage 76, and the valve disc 78b is installed in an outlet 74a of the EGR cooler 74. Similarly to the flow-rate-ratio control valve 50 according to the first embodiment, the flow-rate-ratio control valve 78 is also driven by a VRV, for example. In other words, the flow-rate-ratio control valve 78 is also configured to be able to select arbitrary intermediate opening degrees. The opening degrees of the valve discs 78a and 78b illustrated in FIG. 9 represent an example of those intermediate opening degrees.

To be more specific, the respective mounting angles of the valve discs 78a and 78b with respect to the valve shaft 78c are determined to be able to realize the full bypass state and the full cooling state. This full bypass state is realized as a result of the valve disc 78b being controlled to the full close degree when the valve disc 78a is controlled to the full open degree. Also, this full cooling state is realized as a result of the valve disc 78a being controlled to the full close degree when the valve disc 78b is controlled to the full open degree.

The opening degrees of the valve discs 78a and 78b change in synchronization with the rotation angle of the valve shaft 78c. Thus, according to the flow-rate-ratio control valve 7 configured as described so far, the rotation angle of the valve shaft 78c is adjusted within a rotation angle range from the rotation angle at which the full bypass state is realized to the rotation angle at which the full cooling state is realized. This makes it possible to control the EGR cooler ratio R to arbitrary values.

In addition, when a full bypass opening degree that corresponds to the opening degrees of the valve discs 78a and 78b that realize the full bypass state is selected by adjustment of the rotation angle of the valve shaft 78c, the total amount of the EGR gas does not pass through the EGR cooler 74 and passes through the bypass passage 76. Thus, only the flow of the bypass passing-through gas (gas flow CBP) in FIG. 9 is formed. When, on the other hand, the full cooling opening degree that corresponds to the opening degrees of the valve discs 78a and 78b that realize the full cooling state is selected, the total amount of the EGR gas does not pass through the bypass passage 76 and passes through the EGR cooler 74. Thus, only the flow of the cooler passing-through gas (gas flow C) in FIG. 9 is formed. Moreover, when an arbitrary opening degree is selected, the gas flow CBP and the gas flow C according to the flow rates depending on a selected intermediate opening degree are formed.

Furthermore, as shown in FIG. 9, the EGR valve 46 is installed in a portion of the EGR passage 42 located on the downstream side of a collective portion 72a between the cooler passing-through gas and the bypass passing-through gas.

2-2. Control of Flow-Rate-Ratio Control Valve According to Second Embodiment

In the present embodiment, it is supposed, as a premise, that the intake air temperature control described above is executed as an example of the "temperature control" for the EGR gas temperature using the flow-rate-ratio control valve 78, similarly to the first embodiment. In addition, an example of valve disc for the "vibration reduction control" according to the present embodiment is the valve disc 78a.

2-2-1. Problem Concerning Flow-Rate-Ratio Control Valve

Figure 10A:
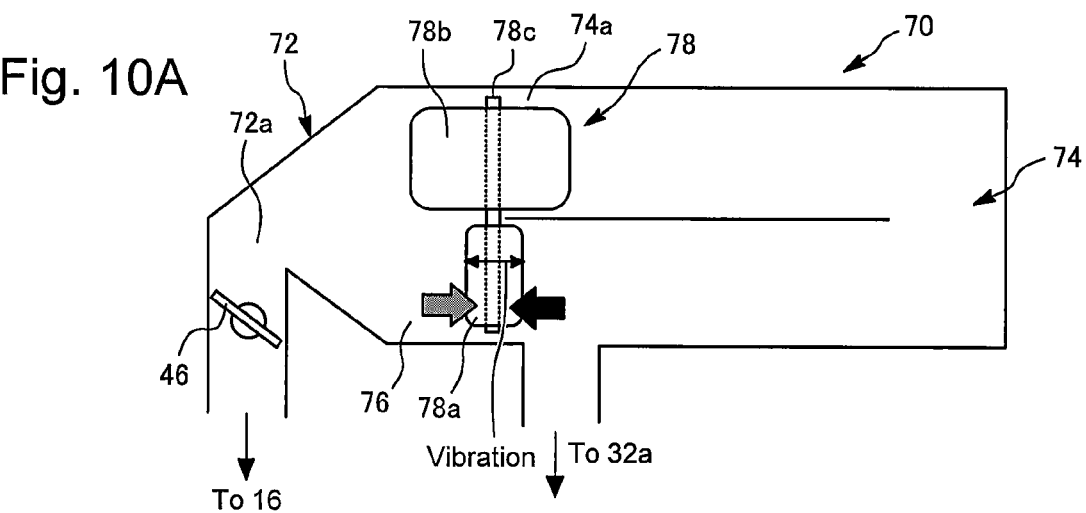
FIGS. 10A and 10B are schematic diagrams for describing pressures P4a' and P4b' that act on a valve disc 78a in a state of a flow-rate-ratio control valve shown in FIG. 9 being controlled to a full cooling opening degree.
Figure 10B:
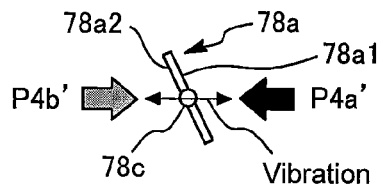

FIGS. 10A and 10B are schematic diagrams for describing pressures P4$a'$ and P4$b'$ that act on the valve disc 78a in a state of the flow-rate-ratio control valve 78 shown in FIG. 9 being controlled to the full cooling opening degree. When the flow-rate-ratio control valve 78 is controlled to the full cooling opening degree, the opening degree of the valve disc 78a corresponds to the full close degree.

FIG. 10B represents the valve disc 78a shown in FIG. 10A seen from the axial direction of the valve shaft 78c. The pressure "P4$a'$" denotes a value of the EGR gas pressure (exhaust gas pressure) that acts on a surface 78a1 of the valve disc 78a located on the upstream side in the EGR gas flow when the full cooling opening degree is selected as shown in FIG. 10A. In addition, similarly, the pressure "P4$b'$" denotes a value of the EGR gas pressure (exhaust gas pressure) that acts on a surface 78a2 of the valve disc 78a located on the downstream side in the EGR gas flow.

Figure 11:
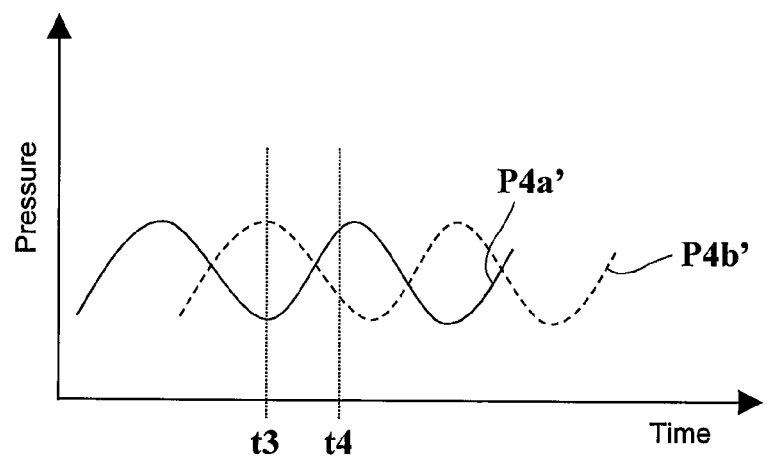
FIG. 11 is a graph that illustrates time waveforms of the pressures P4a' and P4b' shown in FIG. 10A.

FIG. 11 is a graph that illustrates time waveforms of the pressures P4$a'$ and P4$b'$ shown in FIG. 10A. With regard to the EGR device 70 having the configuration shown in FIG. 9, there is a difference in length of propagation paths required for exhaust pulsations that enter into the EGR passage 72 at the same timing to respectively reach the surfaces 78a1 and 78a2 of the valve disc 78. Due to this difference, the phases of pulsation waves of the pressures P4$a'$ and P4$b'$ that respectively act on the surfaces 78a1 and 78a2 at each time point are deviated from each other as shown in FIG. 11.

As described above, similarly in the example of the EGR device 70, the magnitude relationship between the pressures P4$a'$ and P4$b'$ repeatedly changes with a lapse of time due to the phase difference described above (for example, time points t3 and t4 in FIG. 11), as shown in FIG. 11. Thus, in this example, the load (cyclic load) depending on the pressures P4$a'$ and P4$b'$ acts in the radial direction of the valve shaft 78c. In this way, similarly in the flow-rate-ratio control valve 78 according to the present embodiment, the radial vibration of the valve shaft 78c is generated.

It should be noted that the explanation described above for the problem concerning the radial vibration of the valve shaft 78c in a state of the full cooling opening degree being selected has been made with the valve disc 78a in mind. However, this problem may occur not only when the full cooling opening degree is selected but also when an opening degree closer to the full cooling opening degree is selected.

2-2-2. Vibration Reduction Control

In order to address the radial vibration of the valve shaft 78c described above, in the present embodiment, the "vibration reduction control" is also executed when the "opening degree control execution condition" is met, similarly to the first embodiment. Since a detailed example of the "opening degree control execution condition" and the "vibration reduction control" is the same as that for the first embodiment, a detailed explanation thereon is herein omitted. In addition, an example of valve disc for the vibration reduction control according to the present embodiment is the valve disc 78a as described above. Therefore, this vibration reduction control may be executed while regarding, as an example of the "minimum opening degree" of the valve disc according to the present disclosure, the opening degree of the valve disc 78a acquired when the full cooling opening degree is selected (i.e., full close degree).

2-2-3. Advantageous Effects Concerning Control of Flow-Rate-Ratio Control Valve (Vibration Reduction Control)

Figure 12:
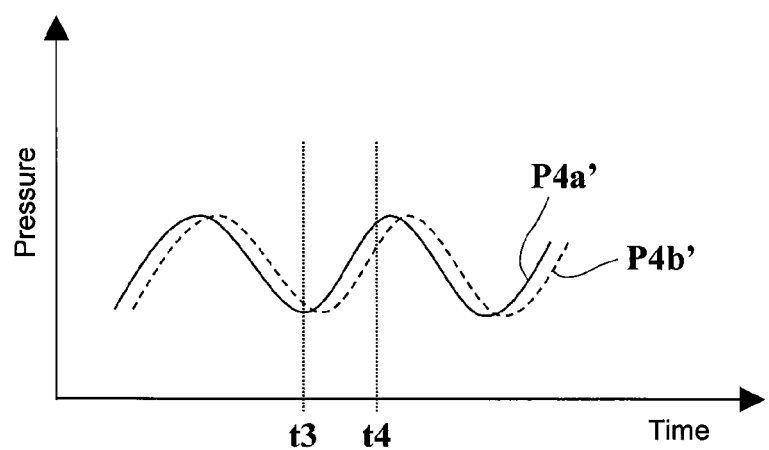
FIG. 12 is a graph for describing advantageous effects of a vibration reduction control that is executed for the valve disc of the flow-rate-ratio control valve shown in FIG. 9.

FIG. 12 is a graph for describing advantageous effects of the vibration reduction control that is executed for the valve disc 78a of the flow-rate-ratio control valve 78 shown in FIG. 9. FIG. 12 represents time waveforms of the pressures P4$a'$ and P4$b'$ acquired when the vibration reduction control opens the valve disc 78a to its opening degree that is equal to or greater than the vibration reduction opening degree θv of the valve disc 78a under a condition that the exhaust pulsation whose magnitude is the same as that of the waveforms shown in FIG. 11 described above propagates in the EGR passage 72.

In an example in which the vibration reduction control is executed for the flow-rate-ratio control valve 78, if the opening degree control execution condition is met when the full cooling opening degree or an opening degree closer thereto is selected, the valve disc 78a is, as needed, opened to an opening degree that is equal to or greater than the vibration reduction opening degree θv.

When the valve disc 78a opens as described above, the flow rate of the bypass passing-through gas (in other words, the flow rate of the EGR gas that passes through the valve disc 78a) increases. This causes the phase difference of the pulsation wave of the pressures P4$a'$ and P4$b'$ at each time point to decrease as shown in FIG. 12. Thus, even if the magnitude relationship between the pressures P4$a'$ and P4$b'$ changes, the pressure difference between them becomes smaller as shown in FIG. 12. The cyclic load that acts in the radial direction of the valve shaft 78c is therefore reduced. This makes it possible to effectively reduce the radial vibration of the valve shaft 78c.

2-3. Modification Example Concerning Second Embodiment (Example of Vibration Reduction Control for Valve Disc 78b)

The second embodiment has described the example in which the valve disc 78a is directed to the vibration reduction control when its full cooling opening degree or an opening degree closer thereto is selected. However, according to the EGR device 70 having the configuration shown in FIG. 9, when the full bypass opening degree is selected, the opening degree of the remaining valve disc 78b corresponds to the full close degree. Accordingly, with the valve disc 78b in mind, the vibration reduction control may alternatively be executed for the valve disc 78b when its full bypass opening degree or an opening degree closer thereto is selected, instead of the example described above. In more detail, this vibration reduction control may be executed while regarding, as an example of the "minimum opening degree" of the valve disc according to the present disclosure, the opening degree of the valve disc 78b acquired when the full bypass opening degree is selected (i.e., full close degree).

Other Embodiments 3-1. Another Example of Acquisition of "Parameter" According to Present Disclosure In the first and second embodiments described above, the parameter described above is exemplified by the pulsation level value that becomes greater when the engine load is greater. However, the acquisition of this parameter may alternatively be performed by the use of, for example, an exhaust gas pressure sensor for detecting the pressure of the gas in the exhaust manifold 32a, instead of the example described above. More specifically, the magnitude (amplitude) of the exhaust pulsation is correlated with the exhaust manifold pressure as already described. The parameter described above may therefore be the exhaust manifold itself detected by the exhaust gas pressure sensor, for example.

3-2. Another Example of Opening Degree Control Execution Condition

The Example of the opening degree control execution condition used in the first and second embodiments described above includes not only the requirement that the pulsation level value is equal to or greater than the threshold value THp but also the requirement that the opening degree of the EGR valve 46 is equal to or smaller than the threshold value THegr. However, even when the EGR valve 46 opens, there is a phase difference between pressures that act on each portion of the valve disc 50a (or valve disc 78a or 78b). This is because timings at which the exhaust pulsation reaches are different due to a difference in location of the each portion. Therefore, another example of the "opening degree control execution condition" according to the present disclosure may only include the "requirement that a parameter that becomes greater when exhaust pulsation acting on a valve disc is greater is equal to or greater than a first threshold value".

The embodiments and modifications described above may be combined in other ways than those explicitly described above as required and may be modified in various ways without departing from the scope of the present disclosure.

What is claimed is:

1. A control device for an internal combustion engine, the internal combustion engine including an EGR device that includes:
   an EGR passage configured to connect an intake air passage of the internal combustion engine with an exhaust gas passage thereof;
   an EGR cooler arranged at the EGR passage;
   an EGR cooler bypass passage through which, when at least a part of EGR gas flowing through the EGR passage bypasses the EGR cooler, the at least a part of EGR gas flows; and
   a flow-rate-ratio control valve equipped with a valve disc and capable of controlling, by adjustment of an opening degree of the valve disc, a flow rate ratio of a flow rate of a cooler passing-through gas that is an EGR gas flowing through the EGR cooler and a flow rate of a bypass passing-through gas that is an EGR gas flowing through the EGR cooler bypass passage,
   wherein the control device is configured, when an opening degree control execution condition is met, to execute a vibration reduction control for controlling the flow-rate-ratio control valve such that the opening degree of the valve disc becomes greater than or equal to a vibration reduction opening degree that is greater than a minimum opening degree within an opening degree control range of the valve disc, and
   wherein the opening degree control execution condition includes a requirement that a parameter that becomes greater when exhaust pulsation acting on the valve disc is greater is equal to or greater than a first threshold value.

2. The control device according to claim 1,
   wherein the EGR device includes an EGR valve arranged in a portion of the EGR passage located on a downstream side of a collective portion between the cooler passing-through gas and the bypass passing-through gas, and
   wherein the opening degree control execution condition includes a requirement that an opening degree of the EGR valve is equal to or smaller than a second threshold value in addition to the requirement that the parameter is equal to or greater than the first threshold value.

3. The control device according to claim 2,
   wherein, in comparison under a same engine operating condition, when the opening degree of the EGR valve is smaller, the vibration reduction opening degree is greater than when the opening degree of the EGR valve is greater.

4. The control device according to claim 1,
   wherein, when the parameter is greater, the vibration reduction opening degree is greater than when the parameter is smaller.

5. The control device according to claim 1,
   wherein the control device is configured to execute a temperature control for controlling the flow-rate-ratio control valve such that its target opening degree required to cause a temperature of the EGR gas introduced into the intake air passage from the EGR passage to approach a target EGR gas temperature is achieved, and
   wherein, when the opening degree control execution condition is met during the temperature control, the vibration reduction control controls the flow-rate-ratio control valve such that the opening degree of the valve disc approaches a greater opening degree of the target opening degree and the vibration reduction opening degree.

6. The control device according to claim 1,
   wherein the vibration reduction opening degree is greater than a maximum value of opening degrees at which chattering of the valve disc occurs.

* * * * *